(12) United States Patent
James et al.

(10) Patent No.: US 6,588,018 B1
(45) Date of Patent: Jul. 1, 2003

(54) METHOD FOR AUTOMATING UPDATING OF CONFIGURATION/STATUS INFORMATION IN MASTER CONTROL SWITCHER

(75) Inventors: Kenneth W. James, Nevada City, CA (US); Alan L. Thorpe, Nevada City, CA (US); Larry R. Walsh, Nevada City, CA (US)

(73) Assignee: Thomson Licensing SA, Boulogne Cedex (FR)

( * ) Notice: Subject to any disclaimer, the term of this patent is extended or adjusted under 35 U.S.C. 154(b) by 0 days.

(21) Appl. No.: 09/289,423

(22) Filed: Apr. 9, 1999

(51) Int. Cl.$^7$ .......................... H04N 7/16; H04N 7/025; H04N 5/268

(52) U.S. Cl. .......................... 725/146; 725/32; 725/36; 348/705

(58) Field of Search ................... 348/722, 705; 725/36, 32, 33, 35, 114–117, 138, 144, 93, 146

(56) References Cited

U.S. PATENT DOCUMENTS

| | | | | |
|---|---|---|---|---|
| 4,814,883 A | * | 3/1989 | Perine et al. ............... 348/461 |
| 5,283,639 A | * | 2/1994 | Esch et al. .................. 348/722 |
| 5,499,046 A | * | 3/1996 | Schiller et al. ............. 725/145 |
| 5,522,044 A | * | 5/1996 | Pascucci et al. ............ 709/222 |
| 5,600,364 A | * | 2/1997 | Hendricks et al. ............. 725/1 |
| 5,682,195 A | * | 10/1997 | Hendricks et al. .......... 725/116 |
| 5,754,255 A | * | 5/1998 | Takamori ..................... 348/705 |
| 5,761,601 A | * | 6/1998 | Nemirofsky et al. .......... 725/34 |
| 5,892,915 A | * | 4/1999 | Duso et al. ................. 725/116 |
| 6,362,856 B1 | * | 3/2002 | Guzik et al. ................ 348/722 |
| 6,378,129 B1 | * | 4/2002 | Zetts .......................... 725/116 |

OTHER PUBLICATIONS

"Video Disck Communications Protocol" [published Oct. 1998] Retrieved from Harris website using Internet <URL: http://www.broadcast.harris.com/support/VDCP.pdf>.*

* cited by examiner

Primary Examiner—John Miller
Assistant Examiner—Scott Beliveau
(74) Attorney, Agent, or Firm—Joseph S. Tripoli; Harvey D. Fried; Francis A. Davenport

(57) ABSTRACT

An automation protocol subscription service has a new SUBSCRIBE command with subscription bits that is sent from an automation controller to a master control switcher to indicate to the master control switcher to which items of configuration/status the automation controller is subscribing. In return when one of the subscribed-to items changes, the master control switcher returns a new SUBSCRIPTION command that indicates the change to the automation controller. In this way the knowledge of the configuration/status of the master controller is maintained at the automation controller.

6 Claims, 1 Drawing Sheet

| AUTOMATION CONTROLLER | | MASTER CONTROL SWITCHER |
|---|---|---|
| 1) CMD (subcommand)(parameters) | ⟶ | |
| 2) QUERY (subcommand) | ⇌ | STATUS (data) |
| * 3) CMD (SUBSCRIBE)(BIT MAP) | ⟶ | |
| * 4) | ⟵ | SUBSCRIPTION (subcommand)(data) |
| * 5) QUERY (SUBSCRIBE) | ⇌ | STATUS (SUBSCRIBE)(BIT MAP) |

* ADDED TO AUTOMATION PROTOCOL

* ADDED TO AUTOMATION PROTOCOL

METHOD FOR AUTOMATING UPDATING OF CONFIGURATION/STATUS INFORMATION IN MASTER CONTROL SWITCHER

BACKGROUND OF THE INVENTION

The present invention relates to management of television broadcast resources, and more particularly to an automation protocol subscription service for assuring that an automation controller always has current status information about a master control switcher being controlled.

A television broadcast station combines video from one or more sources, such as tape recorders, character generators, other production switchers, digital video effects devices, ad inserters, etc., into a single video signal for transmission to television viewers. Such a station may have a plurality of such sources coupled to a master control switcher, such as the Grass Valley M2100 Master Control Switcher manufactured by Tektronix, Inc. of Wilsonville, Oreg. Where programming may be pre-planned in advance, various methods of automating the generation of the transmitted video signal have arisen.

An automation controller is coupled to control the master control switcher and has a "play list" that outlines what sources need to be provided at the output of the master control switcher at what times and configurations to produce the transmitted video signal. The "play list" is converted by an appropriate automation protocol into commands that are initiated by the automation controller to the master control switcher in order for the master control switcher to appropriately access the sources at its input to produce the desired transmitted video signal according to the play list. The automation controller generates the appropriate commands to the master control switcher based upon its knowledge of the current configuration/status of the master control switcher. Assuming a perfect environment and no manual intervention, theoretically once initialized the automation controller would always know the configuration/status of the master control switcher based upon the commands sent by the automation controller to the master control switcher.

However where there are errors in the execution of the commands by the master control switcher, or where manual intervention occurs, such as the insertion of news bulletins into scheduled programs, the configuration/status of the master control switcher changes and such changes are not known to the automation controller. The result may be catastrophic. As one example of a catastrophic effect, an operator may manually take a new source on-air. Since the automation controller does not know of this change in the master control switcher configuration/status, it issues a command to do the same, but instead results in taking the new source off-air. Since commercials are the most frequently transitioned sources on a master control switcher, this results in lost air-time for one or more commercials and lost revenue for the customer.

Therefore before the commands for each event on the play list are sent by the automation controller to the master control switcher, a status check command is sent to the master control switcher to determine what the configuration/status is first so that the automation controller may update its knowledge of the master control switcher configuration/status and generate the appropriate commands for the next event in the play list. Even in this situation, since the status query is usually generated several seconds prior to the actual event commands, there is the possibility that the configuration/status of the master control switcher may change in the short time interval between the status query and the event commands.

What is desired is a method of maintaining knowledge of a master control switcher at an automation controller up to actual execution of event commands from the automation controller to the master control switcher.

BRIEF SUMMARY OF THE INVENTION

Accordingly the present invention provides an automation protocol subscription service that allows the master control switcher to notify the automation controller of any configuration/status changes that occur between commanded events to that the automation controller's knowledge of the master control switcher configuration/status is always current. A new automation protocol subcommand is used to set up a subscription service with the master control switcher, and a new subscription command class is used to provide a response to the automation controller when a change in one of the subscribed services occurs at the master control switcher. In this way the [knowledge of the] automation controller's knowledge of the master control switcher configuration/status is always current so that proper. commands are sent to execute events from a play list at the master control switcher.

The objects, advantages and other novel features of the present invention are apparent from the following detailed description when read in conjunction with the appended claims and attached drawing.

DETAILED DESCRIPTION OF THE INVENTION

Figure 1:
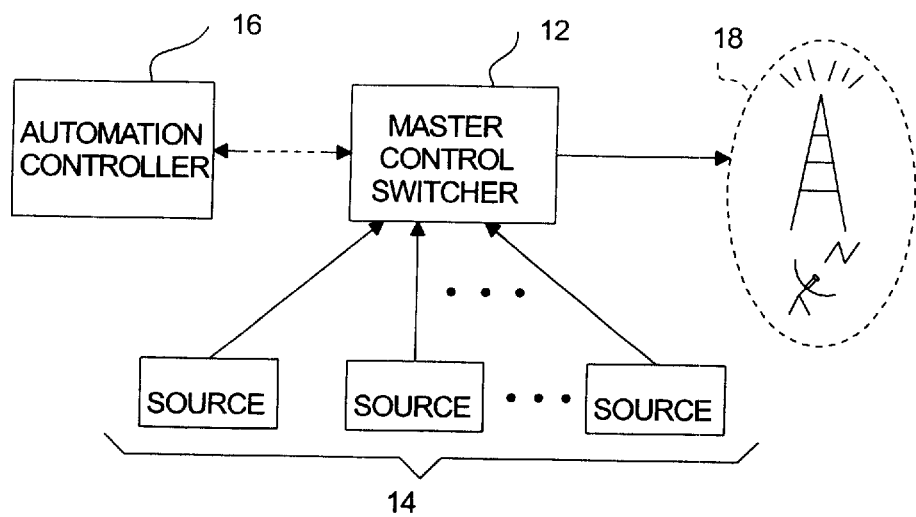
FIG. 1 is a simplified block diagram view of an automated master control system.

Referring now to FIG. 1 a master control switcher 12 is shown having a plurality of sources 14 as inputs. An automation controller 16 is coupled to the master control switcher 12 to control the configuration/status of the master control switcher in order to execute desired events according to a play list. The output from the master control switcher 12 is a video signal that is transmitted by conventional transmitters 18.

TABLE 1

Command Classes

| Mnemonic | Value | Description |
| --- | --- | --- |
| CMD | 0 × 01 | Commands sent to Switcher |
| QUERY | 0 × 02 | Requests send to Switcher |
| STATUS | 0 × 03 | Status from FCM per Query |
| SUBSCRIPTION* | 0 × 04 | Status from FCM per Subscribe |

*new

Figure 2:
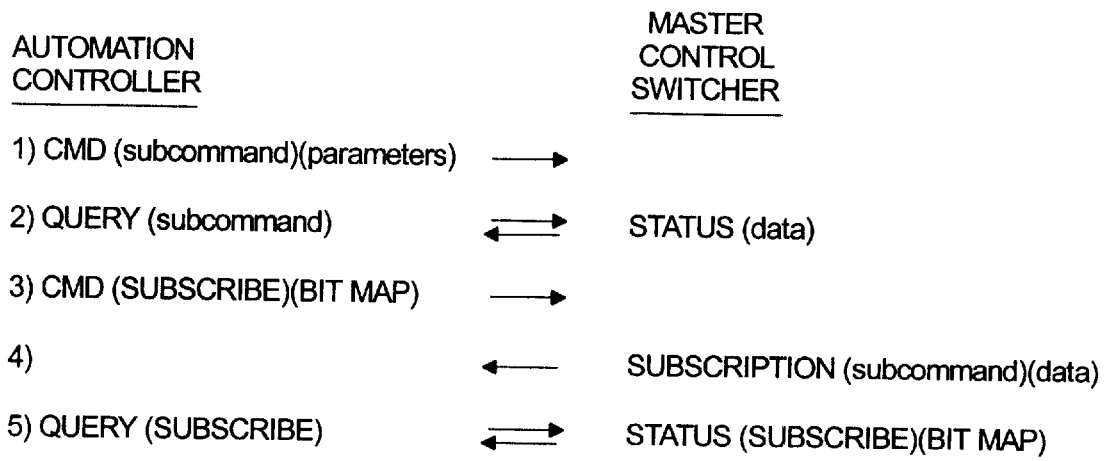
FIG. 2 is an illustrative view of the command flow between an automation controller and a master control switcher according to the present invention.

An existing automation protocol, shown in Table 1 above and illustrated in FIG. 2, has two command classes generated by the automation controller 16, a CMD and a QUERY. The CMD class has several subcommands specifying the particular type of command to be executed by the master control switcher 12, followed by appropriate parameters, if any, as shown in Table 2 below. The third STATUS command class is generated by the master control switcher 12 in response to the QUERY. The STATUS is followed by data that describe the configuration/status of the master control switcher 12.

TABLE 2

Partial Summary of Subcommands

| Mnemonic | Value | CMD | QUERY | Description |
|---|---|---|---|---|
| TX_NEXT | 0 × 01 | yes | yes | Next Transition |
| TX_START | 0 × 02 | yes | no | Start Transition |
| .... | ... | ... | ... | ... |
| SUBSCRIBE* | 0 × 16 | yes | yes | Subscription Service |

*new

Added to the existing protocol by the present invention is a SUBSCRIBE subcommand, as shown in Table 2, that may be included with either the CMD class or the QUERY class from the automation controller 16. Also added is a SUBSCRIPTION command class that returns information from the master control switcher 12 to the automation controller 16 when a subscribed-to event occurs that is not commanded by the automation controller.

New Subscription Command Format
    SUBSCRIBE—Subscription Service
value: 0x16 (unsigned byte)
command format: SUBSCRIBE <subscription bits>
query format: SUBSCRIBE
reply format: SUBSCRIBE <subscription bits>
notes: Any bit set=1 in the <subscription bits> enables subscription to that item. Any bit set=0 disables subscription to that item. All currently undefined bits are set=0.
field information: <subscription bits> (unsigned four bytes)
    bit 0 Preroll/Take Event
    bit 1 Hold Event
    bits 2.31 Reserved
New Subscription Subcommand Format
    SUBSCR_PRETRANS—Preroll/Transition Button Press/Release
value: 0x01 (unsigned byte)
status format:: SUBSCR_PRETRANS <press/release flag>
notes: If this information is currently subscribed-to, it is sent to the automation controller when a user presses/releases the master control switcher's Preset/Preroll button. Normal Preroll/Transition logic in the FCM is not executed.
field information: <pre/release flag> (unsigned byte)
    00 Preroll/Trans Button released
    01 Preroll/Trans Button pressed
    SUBSCR_HOLD—Hold Button Press/Release
value: 0x02 (unsigned byte)
status format:: SUBSCR_HOLD <press/release flag>
notes: If this information is currently subscribed-to, it is sent to the automation controller when a user presses/releases the master control switcher's Hold button. Normal Hold logic in the FCM is not executed.
field information: <press/release flag> (unsigned byte)
    00 Hold Button released
    01 Hold Button pressed The automation controller 16 may subscribe to any subset of available subscription items, only two of which are shown above as an example, using a single CMD with the SUBSCRIBE subcommand and a subscription bit-map that defines the subscription items. The automation controller 16 ensures that every time the CMD(SUBSCRIBE) <subscription bits> is sent, all the subscription items are identified, i.e., the controller is responsible for OR'ing the subscription bits. The automation controller 16 may also QUERY for the subscription bits from the master control switcher 12 defining all currently subscribed-to items. In general, subscription information from the master control switcher 12 comes in two forms-notification of an event (no data) and notification of an event or change of some operational parameter (with data). The data length varies per the event definition.

A new configuration option allows the user to select one of the following behaviors—cancel all subscriptions on reboot of the frame controller module (FCM) in the master control switcher 12 or continue all subscriptions after an FCM reboot. The console command is: >autoSubSvcTempSaveCfgSee[on/off]. With this attribute "on", the Subscription Data is temporarily saved until the FCM reboots. If the attribute is "off" and Subscription Service Requests are made by the automation controller 16, those subscribed-to items are permanently saved in the non-volatile RAM of the FCM and are restored upon FCM reboot. The automation controller 16 may then ask the FCM for those values with the QUERY(SUBSCRIBE) command. If this attribute is "on" and new subscription requests are sent by the automation controller 16 to the master control switcher 12, the new subscription requests override those saved in the non-volatile RAM, but do not persist after the next reboot.

Thus the present invention provides an automation subscription service that maintains automation controller knowledge of the master control switcher configuration/status current by using a new SUBSCRIBE command to set up the master control switcher to automatically report subscription information to the automation controller when a subscribed-to item changes.

What is claimed is:

1. A method of operating a master control switcher having a configuration/status described by a plurality of items of configuration/status information, each item having an associated value, the master control switcher combining input video signals in accordance with the current configuration/status of the master control switcher to generate an output video signal, and said method comprising:

(a) selecting at least one item of configuration/status information, (b) sending a subscription command from an automation controller to the master control switcher, the subscription command specifying at least said one item of configuration/status information, (c) automatically sending the value associated with said one item of configuration/status information from the master control switcher to the automation controller when the value associated with said one item changes, and (d) storing the value associated with said one item of configuration/status information on the automation controller, and wherein step (b) includes generating a subscribe command having an array of subscription bits associated therewith, said array of subscription bits including a bit corresponding to each of said plurality of items of information and the status of a bit defining whether the corresponding item is selected.

2. A method according to claim 1, wherein step (c) includes sending a subscription command having a subcommand that specifies the value associated with said one item of configuration/status information.

3. A method of operating a master control switcher having a configuration/status described by a plurality of items of configuration/satatus information, each item having an associated value, the master control switcher combining input video signals in accordance with the current configuration/status of the master control switcher to generate an output video signal, and said method comprising:

(a) selecting at least one item of configuration/status information, (b) sending a subscription command from an automation controller to the master control switcher, the subscription command specifying at least said one item of configuration/status information, (c) automatically sending the value associated with said one item of configuration/status information from the master control switcher to the automation controller when the value associated with said one item changes, and (d) storing the value associated with said one item of configuration/status information on the automation controller, and wherein the automation controller generates a command having a subcommand and step (b) includes generating a SUBSCRIBE subcommand having a subscription bit map associated therewith, said subscription bit map including a bit corresponding to each of said plurality of items of configuration/status information and the status of the bit corresponding to said one item determining that said one item is selected.

4. An automated master control system comprising:

a master control switcher having a configuration/status described by a plurality of items of configuration/status information, each item having an associated value, the master control switcher combining input video signals in accordance with the current configuration/status of the master control switcher to generate an output video signal, an automation controller coupled to the master control switcher for controlling the configuration/status of the master control switcher, and a means for selecting at least one item of configuration/status information, and wherein the automation controller includes a memory means for storing configuration/status information of the master control switcher and a means for sending a subscription command that specifies at least said one item of configuration/status information to the master control switcher, and the master control switcher includes a means for automatically sending at least the value associated with said one item of configuration/status information from the master control switcher to the automation controller when the said one selected item changes, and wherein the means for sending a subscription command includes a means for generating a subscribe command having an array of subscription bits associated therewith, said array of subscription bits including a bit corresponding to each of said plurality of items of information and the status of a bit defining whether the corresponding item is selected.

5. A system according to claim 4, wherein the means for sending configuration/status information includes a means for sending a subscription command having a subcommand that specifies the value associated with said one item of configuration/status information.

6. An automated master control system comprising:

a master control switcher having a configuration/status described by a plurality of items of configuration/status information, each item tom having an associated value, the master control switcher combining input video signals in accordance with the current configuration/status of the master control switcher to generate an output video signal, an automation controller coupled to the master control switcher for controlling the configuration/status of the master control switcher, and a means for selecting at least one item of configuration/status information, and wherein the automation controller includes a memory means for storing configuration/status information of the master control switcher and a means for sending a subscription command that specifies at least said one item of configuration/status information to the master control switcher, and the master control switcher includes a means for automatically sending at least the value associated with said one item of configuration/status information from the master control switcher to the automation controller when the said one selected item changes, and wherein the automation controller includes a means for generating a command having a subcommand and the means for sending a subscription command includes a means for generating a SUBSCRIBE subcommand having a subscription bit map associated therewith, said subscription bit map including a bit corresponding to each of said plurality of items of information and the status of the bit corresponding to said one item determining that said one item is selected.

* * * * *